(No Model.)
G. D. FERRIS.
MINNOW BUCKET.
No. 553,456. Patented Jan. 21, 1896.
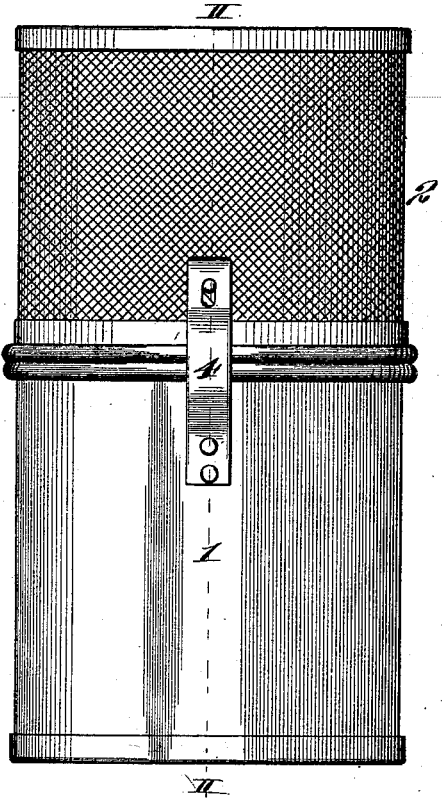
Fig. I
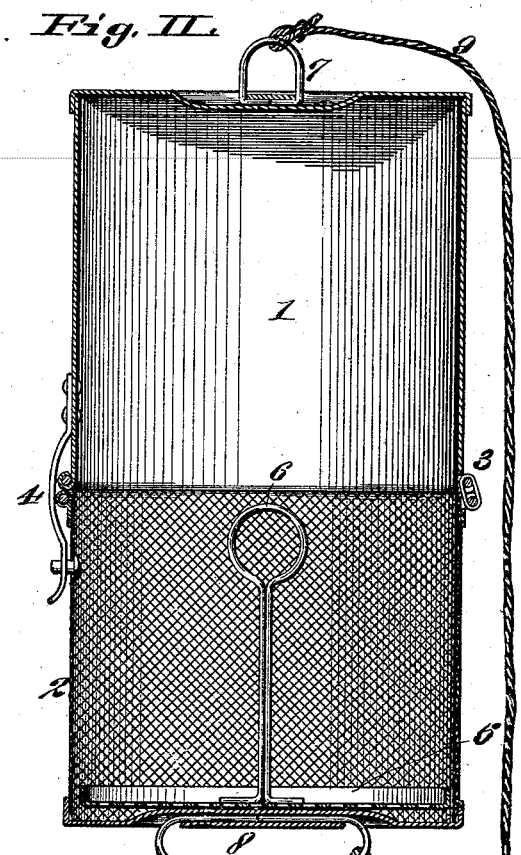
Fig. II
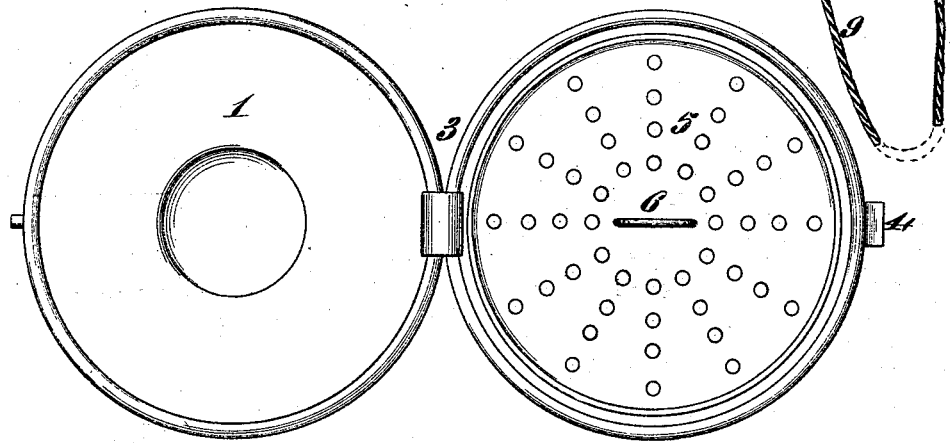
Fig. III
Attest:
Charles Pickles.
Stanley Stoner
Inventor:
G. D. Ferris
By Knight Bro'
attys

UNITED STATES PATENT OFFICE.

GEORGE D. FERRIS, OF ST. LOUIS, MISSOURI.

MINNOW-BUCKET.

SPECIFICATION forming part of Letters Patent No. 553,456, dated January 21, 1896.

Application filed April 1, 1895. Serial No. 543,966. (No model.)

*To all whom it may concern:*

Be it known that I, GEORGE D. FERRIS, residing at the city of St. Louis, State of Missouri, have invented a new and useful Improvement in Minnow-Buckets, of which the following is a full and exact description, reference being had to the accompanying drawings, forming a part of this specification.

Figure I illustrates a side elevation of my improved bucket. Fig. II illustrates a vertical section thereof through the line II II of Fig. I. Fig. III illustrates a top view of the bucket, the two parts thereof being opened.

The bucket is made in two sections, of which the part numbered 1 is solid and water-tight. 2 is the second section and is made of gauze, perforated tin, or similar substance. These two sections are hinged together at 3, and are held in place by the spring-clasp 4.

5 is a pan having a perforated bottom and adapted to fit inside of the bucket. 6 is a handle to the said pan.

7 and 8 are loops secured to the top and bottom of the bucket, and 9 is a cord, the two ends of which are tied to the two loops 7 and 8.

The device is operated as follows: The solid portion 1 of the bucket, placed in the position shown in Fig. I, is filled with water, and the minnows placed therein. The part 2 is then secured in position by means of the clasp 4, and the device can be carried in the position shown in Fig. I from place to place as desired. Upon reaching the fishing-place the bucket is lowered into the water by means of the cord 9. When submerged the cord 9 is used to invert the device, turning over to the position shown in Fig. I. The part 1 thus forms an air-chamber, furnishing fresh air for the minnows, and allowing the device to float. The perforated part 2, in which the minnows are now confined, allows the water of the creek to circulate freely, thus assuring a supply of fresh water to the said minnows. When a minnow is wanted, the bucket is drawn from the water by means of the cord 9 and the clasp 4 unfastened. The perforated pan 5 is raised by means of the handle 6, and a minnow taken as required. The pan is then lowered, the parts secured, and the device replaced in the water.

It is thus seen that my device secures for the minnows a supply of both fresh air and fresh water, both of which are essential. There being no interior bucket with a small opening, such as is provided in former constructions, it is easy to procure a minnow when needed. The construction is simple and strong and most convenient to operate.

I claim as my invention and desire to secure by Letters Patent—

In a minnow bucket, the combination of a water tight compartment, a perforated compartment hinged thereto and having communication therewith, suitable means for locking the two parts together, and means in connection with the two compartments for inverting the bucket when placed in water so as to have the water tight compartment serve as an air chamber for floating the bucket, substantially as and for the purpose set forth.

G. D. FERRIS.

In presence of—
 A. C. BROWN,
 STANLEY STONER.